(12) United States Patent
Lu

(10) Patent No.: US 8,342,349 B2
(45) Date of Patent: Jan. 1, 2013

(54) FOOD CONTAINER

(75) Inventor: Flying Lu, Shanghai (CN)

(73) Assignee: Pacific Market International, LLC, Seattle, WA (US)

(*) Notice: Subject to any disclaimer, the term of this patent is extended or adjusted under 35 U.S.C. 154(b) by 353 days.

(21) Appl. No.: 12/699,168

(22) Filed: Feb. 3, 2010

(65) Prior Publication Data

US 2011/0186585 A1 Aug. 4, 2011

(51) Int. Cl.
*A47G 19/00* (2006.01)

(52) U.S. Cl. .................. 220/23.86; 220/4.26; 220/23.83; 206/546; 206/508

(58) Field of Classification Search .................. 206/503, 206/508, 541, 546, 549; 220/4.26, 4.27, 220/23.83, 23.86
See application file for complete search history.

(56) References Cited

U.S. PATENT DOCUMENTS

| | | | | | |
|---|---|---|---|---|---|
| 2,077,219 | A | * | 4/1937 | Conner | 215/6 |
| 2,488,611 | A | * | 11/1949 | Stallings | 215/10 |
| 2,836,323 | A | * | 5/1958 | Robinson | 220/4.27 |
| 3,067,896 | A | * | 12/1962 | Berg et al. | 215/12.1 |
| 3,348,716 | A | * | 10/1967 | Nakata | 215/6 |
| 3,369,691 | A | * | 2/1968 | Wei | 220/4.27 |
| 3,384,259 | A | * | 5/1968 | Hoffstadt | 220/4.27 |
| 3,509,813 | A | * | 5/1970 | Appelt | 99/432 |
| 4,027,779 | A | * | 6/1977 | De Long | 220/23.83 |
| 5,312,011 | A | * | 5/1994 | Fischer | 220/528 |
| 5,366,089 | A | * | 11/1994 | Parker | 206/546 |
| 5,386,922 | A | * | 2/1995 | Jordan | 220/23.83 |
| 5,409,128 | A | * | 4/1995 | Mitchell | 220/23.4 |
| 5,498,333 | A | * | 3/1996 | Canther | 210/198.1 |
| 5,542,206 | A | * | 8/1996 | Lisch | 43/54.1 |
| 5,799,787 | A | * | 9/1998 | Talbot | 206/315.11 |
| 6,199,699 | B1 | * | 3/2001 | Eastman | 206/545 |
| 6,752,287 | B1 | * | 6/2004 | Lin | 220/254.9 |
| 7,703,641 | B2 | * | 4/2010 | Bravo et al. | 222/465.1 |
| 7,806,284 | B2 | * | 10/2010 | Mangano | 220/4.27 |
| 2005/0199622 | A1 | * | 9/2005 | Radow | 220/4.27 |
| 2007/0012693 | A1 | * | 1/2007 | Kummer | 220/4.27 |

* cited by examiner

*Primary Examiner* — David Fidei
(74) *Attorney, Agent, or Firm* — Davis Wright Tremaine LLP; George C. Rondeau, Jr.

(57) ABSTRACT

A container assembly for storing and transporting consumable products. The container assembly includes two or more containers, each having a container coupling portion configured to facilitate the coupling of one container to another container. The container assembly also includes one or more adaptor lids operative to seal a cavity of a container by threaded engagement therewith, and to selectively couple two containers together. In some embodiments, two containers may be coupled to each other by placing a first container on top of a second container and rotating the two containers relative to each other. The container assembly may be operative to permit multiple quantities and sizes of containers to be selectively coupled together to provide flexibility for a user to store and transport a variety of consumable products. The container assembly may also include a lid having a handle to allow a user to easily transport the container assembly.

18 Claims, 7 Drawing Sheets

FOOD CONTAINER

BACKGROUND

It may often be desirable to prepare a lunch or other meal for consumption at a remote location and at a later time. The food may generally be prepared and placed within a reusable or disposable carrying container and then transported and stored within the container until it is time to consume the food. Because it may be advantageous to maintain the food items in a cold or hot condition for a period of time, it may also be desirable for the food transportation and storage container to include one or more insulated food storage chambers. Further, in order to permit separation of different food items (e.g., hot items and cold items, soup and salad, or the like), it may be an additional benefit if the insulated chambers were provided with a plurality of food storage cavities adapted to receive therein various food items.

DETAILED DESCRIPTION

Systems and methods described herein provide for container assemblies for storing and transporting consumable products (e.g., rice, soup, vegetables, or the like). The container assemblies generally include two or more containers, each having a container coupling portion configured to facilitate selective coupling of one container to another container. The container assemblies may also include one or more adaptor lids operative to seal a cavity of a container by threaded engagement therewith, and to selectively couple two containers together. In some embodiments, two containers may be coupled to each other by placing a first container on top of a second container and rotating the two containers relative to each other to lock them together. Advantageously, the container assemblies may be operative to permit multiple quantities and sizes of containers to be selectively coupled together to provide flexibility for a user to store and transport a variety of consumable products. The container assemblies may also include a lid having a handle to allow a user to easily transport the container assemblies from one location to another (e.g., from home to work).

Figure 1:
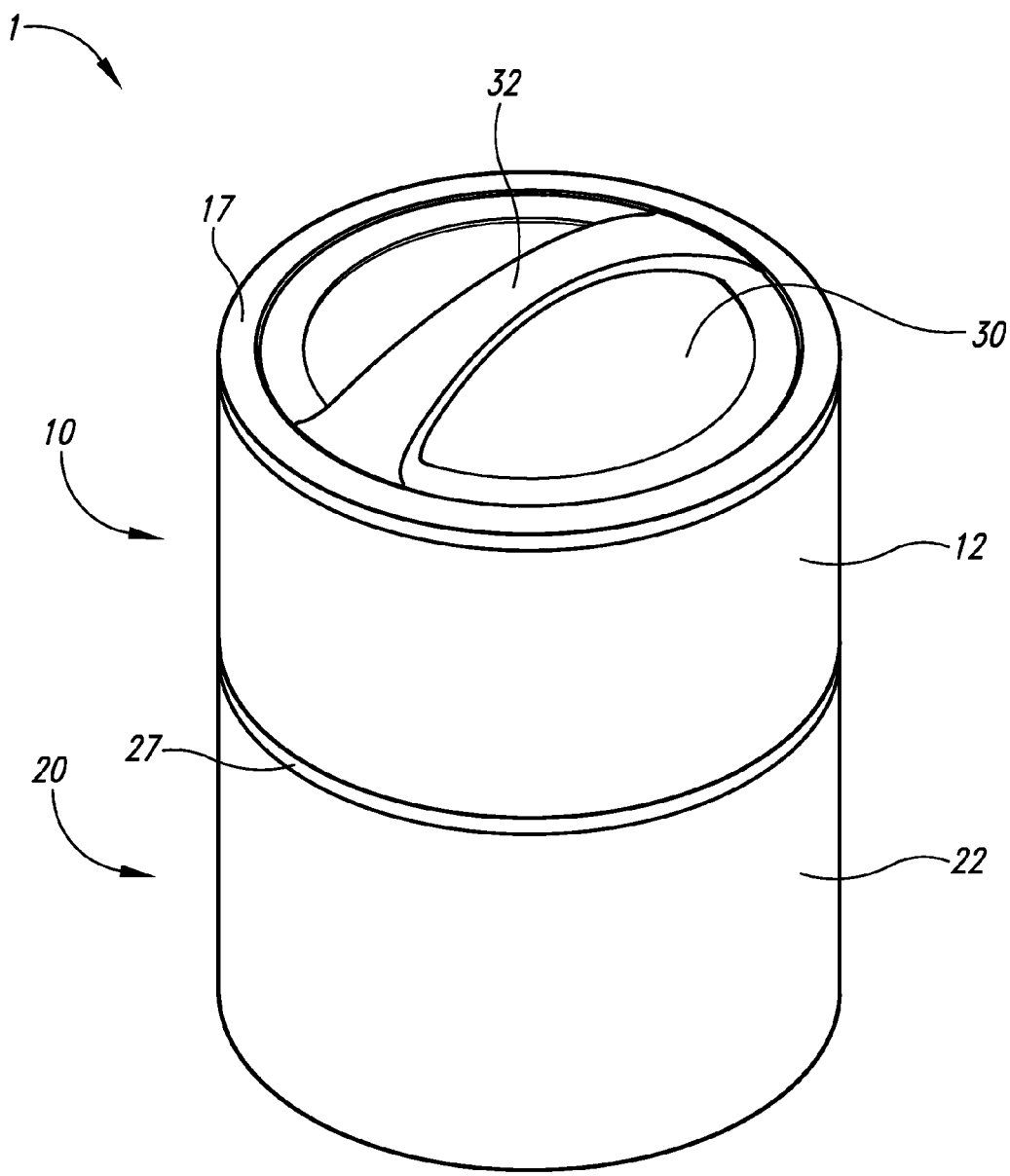
FIG. 1 is a top perspective view of one embodiment of a food container assembly.

A food container assembly 1 is shown in FIG. 1 that includes a top container 10 removably coupled to a bottom container 20. Each of the containers 10 and 20 includes a receptacle portion that includes a cylindrically shaped sidewall 12 and 22, respectively, sized for receiving consumable products (e.g., rice, salad, vegetables, and the like), an upwardly open top portion 17 and 27, respectively, and a bottom closed end 19 and 29 (shown in FIG. 4), respectively. The containers 10 and 20 may be substantially similar to each other or may differ in various ways. For example, in one embodiment the containers 10 and 20 are substantially identical except that the heights of the sidewalls 12 and 22 are different, such that the volume of the containers 10 and 20 are different (e.g., 0.6 liters and 0.3 liters, or the like). As can be appreciated, different size containers may be advantageous so that a user may select a size appropriate for the type and quantity of a consumable product to be stored therein. Further, the containers 10 and 20 may be formed from any suitable material. In some embodiments the containers are integrally formed from a thermoplastic polymer, such as Polypropylene. Additionally, the containers 10 and 20 may include double wall foam insulation in order to keep consumable products hot or cold for an extended period of time.

As shown, a top lid 30 is attached to the container 10 near the top portion 17 and functions to close or seal a top open end of the container 10. Additionally, the top lid 30 may include a handle portion 32 operative to allow a user to threadably engage the top lid 30 with the container 10, and to conveniently carry the container assembly 1. To engage with the container 10, the top lid 30 includes exterior threads (see threads 34 shown in FIGS. 3-4) that may be threadably engaged with interior threads (see threads 16 shown in FIGS. 3-4) of the container 10. Further, as will be described in further detail below with regard to FIGS. 3-4, the container 10 may be removably coupled to the container 20 positioned therebelow at a location near the top portion 27 thereof to form the container assembly 1, such that a user may carry the container assembly 1 by the handle 32 of the top lid 30. The top container 10 is removably coupled to the bottom container 20 using an adaptor lid 70 for the bottom container as will be described below in greater detail with respect to the embodiment of FIG. 2. As can be appreciated, the design of the container assembly 1 permits multiple containers to be carried using a single handle. Similar to the container 10 and 20, the top lid may be formed from any suitable material including the same material used in the containers 10 and 20.

Figure 2:
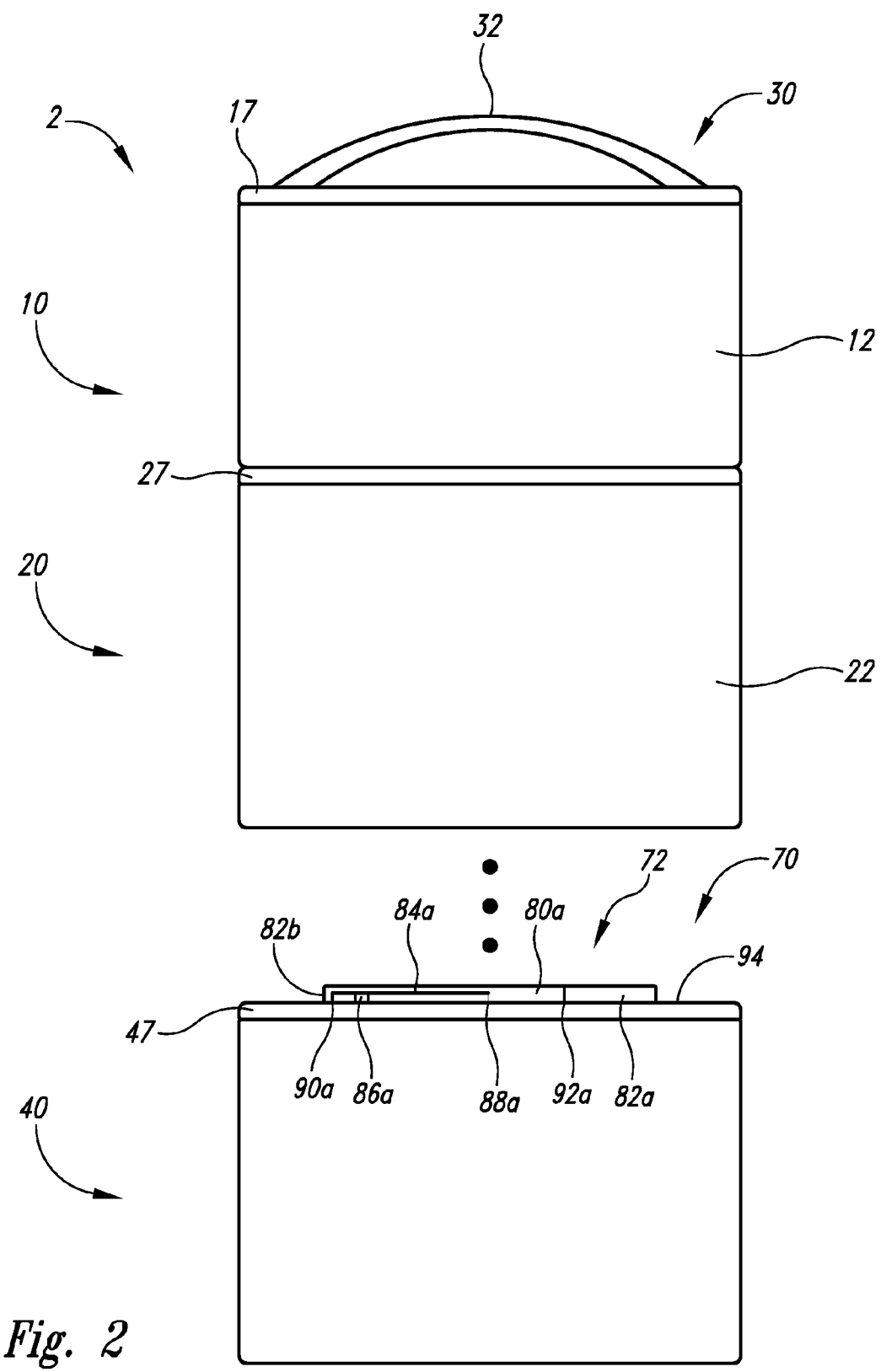
FIG. 2 is a side elevational view of a second embodiment of a food container assembly.
Figure 8:
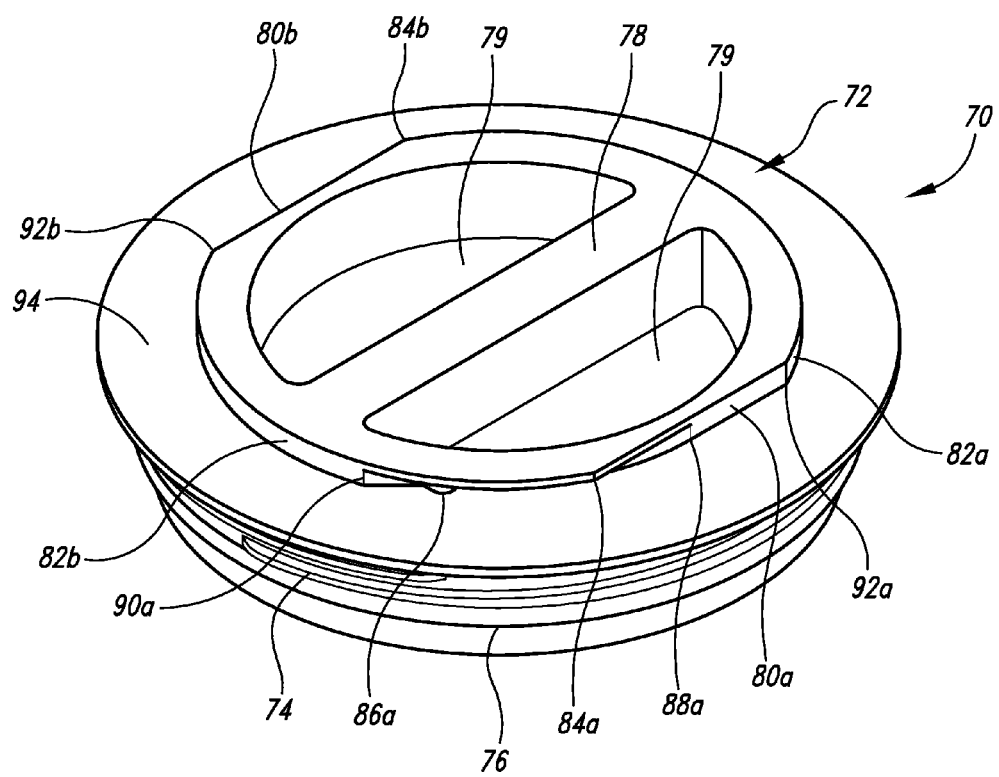
FIG. 8 is a top perspective view of an exemplary adaptor lid.

FIG. 2 illustrates a second embodiment wherein the containers 10 and 20 are part of a food container assembly 2 that includes three or more containers including the containers 10 and 20, a bottom container 40, and if desired one or more containers positioned in between the containers 20 and 40. In this configuration, all of the containers in the container assembly 2 are removably coupled to each other such that a user may carry the entire assembly 2 using the handle 32 of the top lid 30, which is removably coupled to the top container 10. To selectively attach each of the containers to the container positioned above it, an adaptor lid 70 is used to close or seal a top end of each of the containers other than the top container 10 which is closed by the top lid 30. The adaptor lid 70 has a coupling portion 72, as best illustrated in FIG. 8. Although the containers 10, 20, and 40 are shown as being substantially equal in size, those skilled in the art will readily recognized that various shapes, sizes, colors, and the like may be used for the containers. Further, the number of containers connected together in a container assembly may include two or more containers (e.g., three, four or more containers). As can be appreciated, the container assembly 2 provides substantial flexibility for a user to transport consumable products for later consumption by allowing many combinations of numbers and sizes of stackable, interlocking containers.

Figure 3:
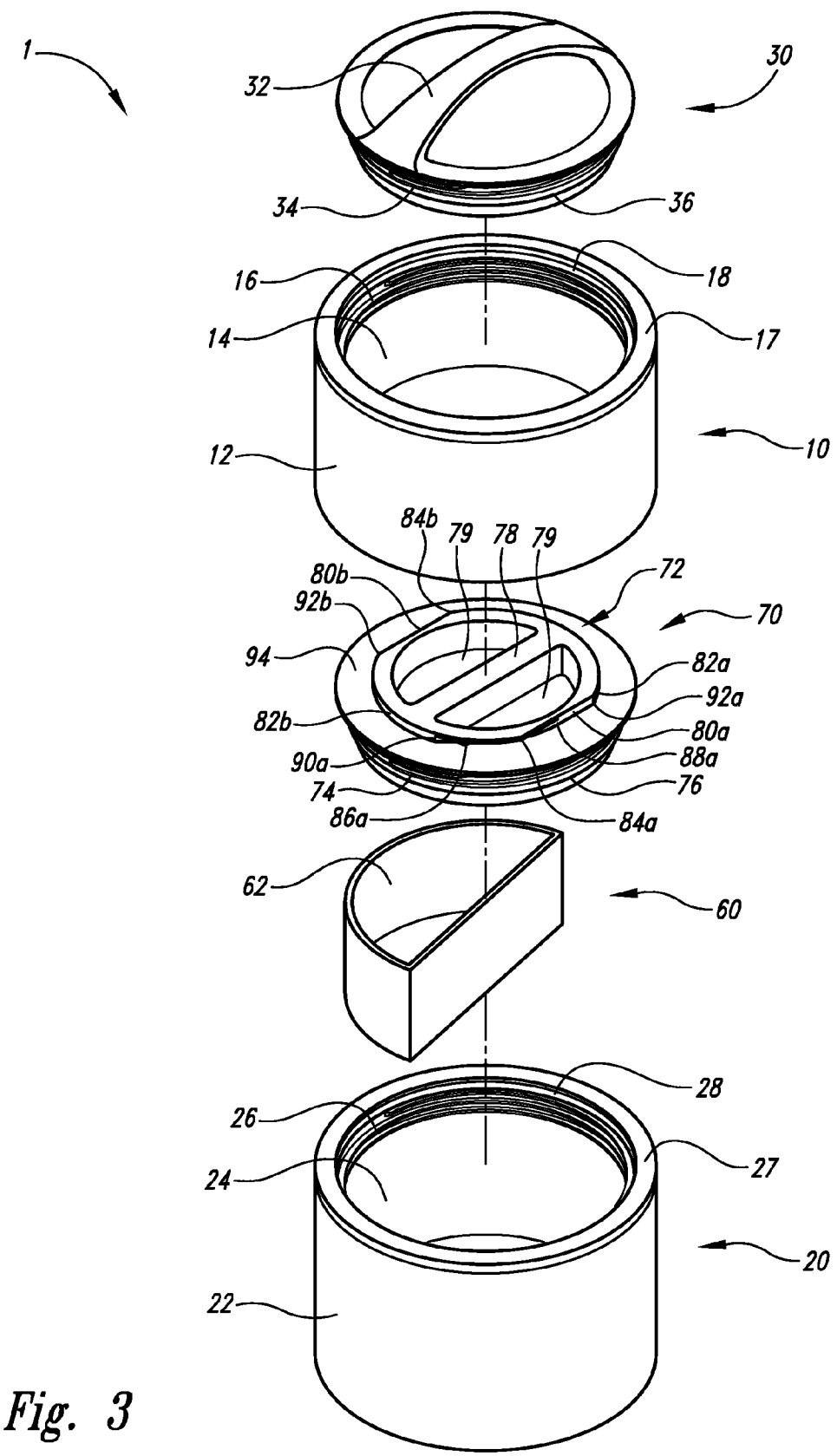
FIG. 3 is an exploded top perspective view of the food container assembly shown in FIG. 1.
Figure 4:
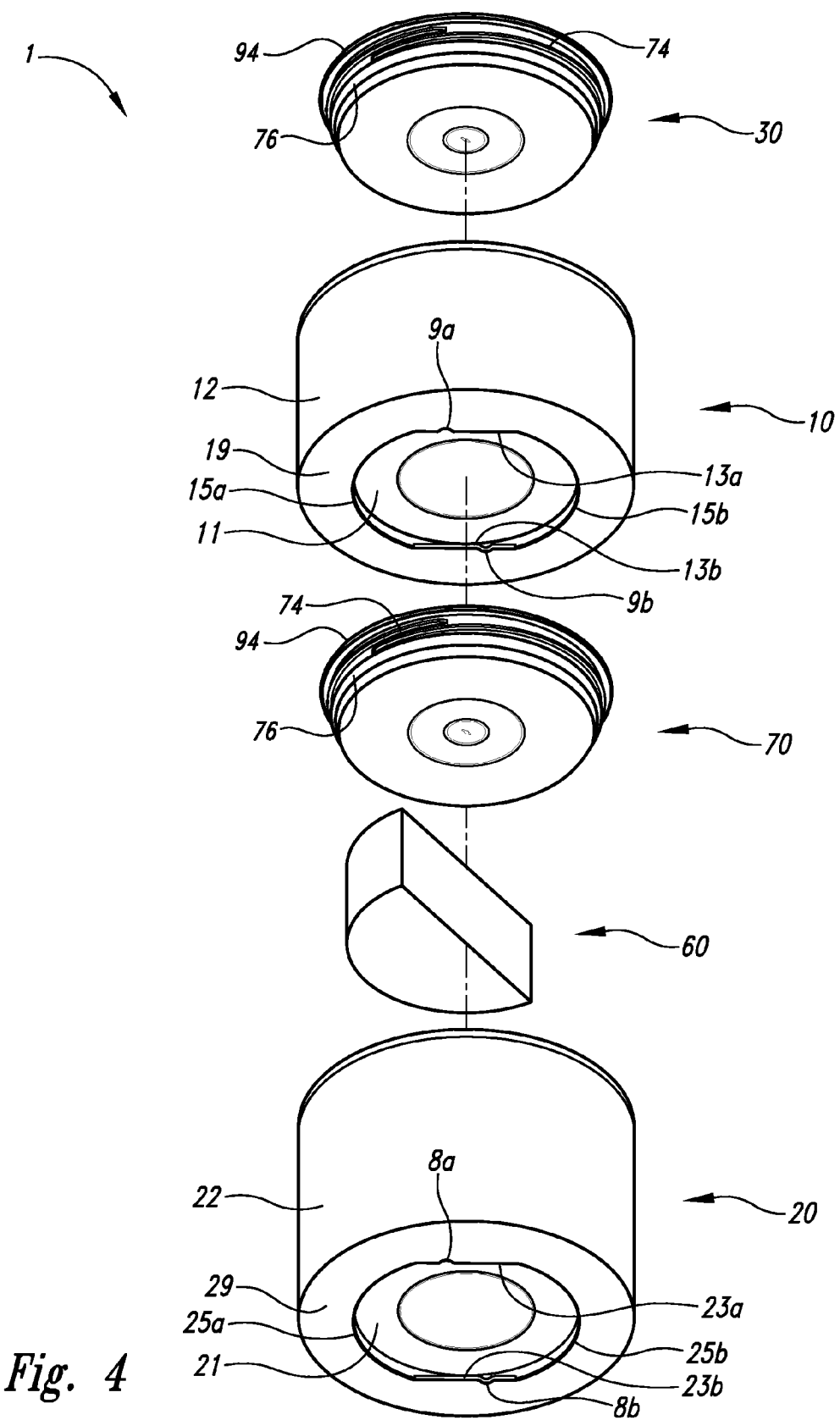
FIG. 4 is an exploded bottom perspective view of the food container assembly shown in FIG. 1.

FIGS. 3-4 illustrate an exploded top-perspective view (FIG. 3) and an exploded bottom-perspective view (FIG. 4) of the container assembly 1 shown in FIG. 1 in the fully assembled state ready for carrying by the handle portion 32 of the top container 10. As shown, the sidewall 12 of the container 10 forms an interior cavity 14 for storing one or more consumable products. The sidewall 12 also includes interior threads 16 positioned on an interior surface near the top portion 17 of the container 10. As noted above, the threads 16 are configured to permit threaded engagement with the threads 34 positioned circumferentially on a lower portion of the top lid 30. To provide a fluid-tight seal between the top lid 30 and the container 10, an annular seal 36 (e.g., an O-ring seal) may be provided on the top lid 30 as well as an annular groove 18 (e.g., an O-ring seat) sized to sealably receive the annular seal 36 on the container 10. The annular seal 36 may be formed from any suitable material. In one or more embodiments, the annular seal 36 is formed from silicone, but other materials may be used.

As may best be viewed in FIG. 4, the container 10 also includes a container coupling portion 11 formed in part by a circular recess in the bottom closed end 19 of the container 10 (defined by a circular interior sidewall). The container coupling portion 11 is operative to facilitate engagement of the container 10 with the adaptor lid 70 of another container positioned therebelow (e.g., engagement with container 20). Two oppositely positioned lock members 13a and 13b at a lower end of the circular recess extend inwardly beyond the circular interior sidewall of the circular recess and provide the circular recess with a downwardly facing opening defined by two arcuate-shaped lower edges 15a and 15b of the circular interior sidewall of the circular recess, and two opposing straight edges of the lock members 13a and 13b extending between the arcuate lower edges 15a and 15b. The lock members 13a and 13b each include a notched portion 9a and 9b, respectively. The lock members 13a and 13b bridge a portion of opposing sections of the circular recess to define a gap between the lock members and the interior recess that is operative to allow selective engagement of the container 10 with the adaptor lid 70 of another container positioned therebelow.

As noted above, the container 20 includes similar features as the container 10. That is, the container 20 includes an interior cavity 24 and interior threads 26 positioned on an interior surface near a top surface 27, as well as an annular groove 28 sized to receive an annular seal 76 on the adaptor lid 70 (or the annular seal 36 of the top lid 30 if container 20 is used as the uppermost positioned container in a container assembly). The container 20 also includes the bottom closed end 29 and a container coupling portion 21 of the same construction as the container coupling portion 11 of the container 10 described above. This includes lock members 23a and 23b with notched portions 8a and 8b, respectively, and arcuate lower edges portions 25a and 25b. The container coupling portion 21 allows another container with an adaptor lid 70 to be positioned below the container 20 and coupled thereto to create a stack of three containers.

The container assembly 1 may also include a divider receptacle 60 that includes an interior cavity 62. In operation, a user may insert the divider receptacle 60 into the container 20 (or the container 10) to provide a divided volume inside the interior cavity 24 of the container 20 (or the inner cavity 14 of the container 10). In this regard, a user may place two different consumable products into the single container 20 with the divider receptacle 60 functioning to keep the products separated. As an example, a user may desire to store rice inside the divider receptacle 60 and vegetables inside the interior cavity 24 of the container 20 not occupied by the divider receptacle and hence outside the divider receptacle. In the embodiment shown in FIGS. 3-4, the divider receptacle 60 has a half-cylinder shape so that it occupies substantially half of the volume of the interior cavity 24 of the container 20. However, it should be recognized that other shapes, sizes, and quantities of divider receptacles may be used.

As noted above, to facilitate coupling between the bottom container 20 and the top container 10, the adaptor lid 70 is used to close the container 20. As also noted above, the adaptor lid 70 also operates to close or seal the interior cavity 24 of the bottom container 20. For illustration purposes, the adaptor lid 70 is also shown in isolation in FIG. 8. The adaptor lid coupling portion 72 of the adaptor lid 70 includes a top surface 94, and a lower portion that includes exterior threads 74 and the annular seal 76. Similar to the threads 34 and annular seal 36 of the top lid 30, the threads 74 and seal 76 of the adaptor lid 70 are configured to permit threaded engagement of the adaptor lid to the container 20 (or any other container in a container assembly). The adaptor lid coupling portion 72 includes a handle portion 78 and a recess 79 to each side thereof for allowing a user to grip and rotate the adaptor lid 72 relative to the container 20 to threadably engage the threads of each component together, thereby sealing the cavity 24 of the container 20, and to remove the adaptor lid from the container 20.

The adaptor lid coupling portion 72 of the adaptor lid 70 includes a raised portion that is designed to engage with the container coupling portion 11 (shown in FIG. 4) of the container 10 or any other container positioned above the container 20 and to which it is to be coupled. More specifically, the adaptor lid coupling portion 72 includes two oppositely positioned substantially straight sidewall portions 80a and 80b, and two substantially arcuate sidewall portions 82a and 82b extending therebetween. The substantially straight portions 80a and 80b extend from point 92a to point 84a and from point 92b to point 84b, respectively. Similarly, the substantially arcuate portions 82a and 82b extend from point 84b to point 92a and from point 84a to point 92b, respectively. This defines a shape generally corresponding to the shape and size of the downwardly facing opening of the container coupling portion 11 of the top container 10. To permit coupling with the container coupling portion 11, the adaptor lid coupling portion 72 includes a first flange formed between the points 88a and 90a, thus including a portion of the straight portion 80a and the arcuate portion 82b. As shown, the first flange is raised above the top surface 94 of the adaptor lid 70 such that a gap is formed between the first flange and the top surface 94. Similarly, the adaptor lid coupling portion 72 includes a second flange oppositely positioned from and substantially identical to the first flange and including a portion of the straight portion 80b and the arcuate portion 82a of the adaptor lid coupling portion 72. As may best be viewed in FIG. 8, the first flange includes a downwardly projecting portion 86a (i.e., a protrusion) positioned on a bottom surface that may be used to engage with the notched portion 9a of the container coupling portion 11 (see FIG. 4) of the container 10. Similarly, the second flange includes a downwardly projecting portion (not shown) positioned on a bottom surface that may be used to engage with the notched portion 9b of the container coupling portion 11.

Figure 5:
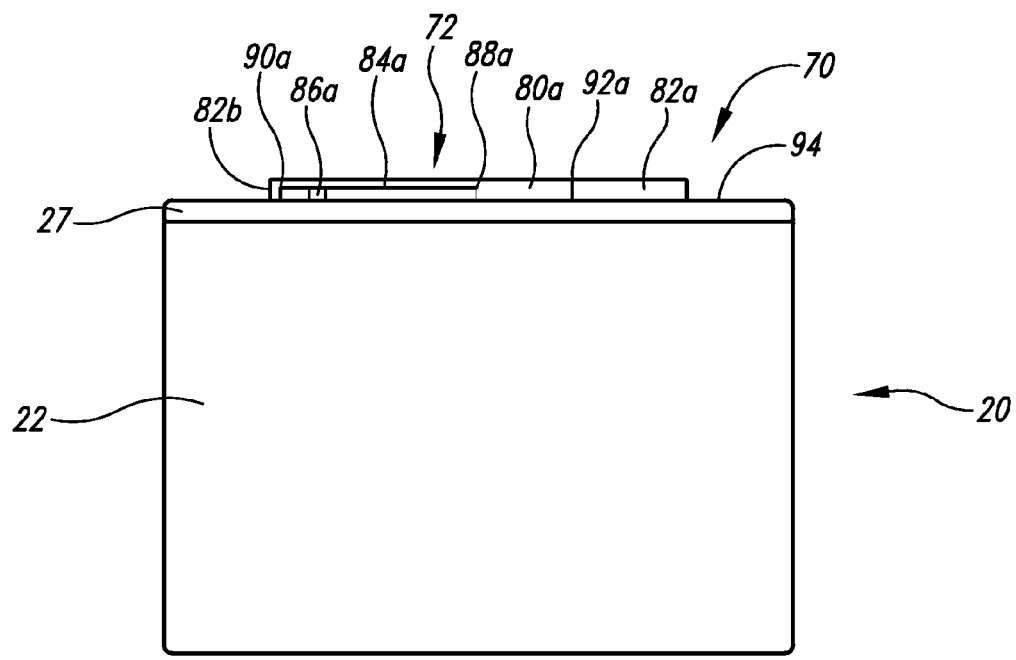
FIG. 5 is a side elevational view of one food container which is part of the food container assembly shown in FIG. 1.
Figure 6:
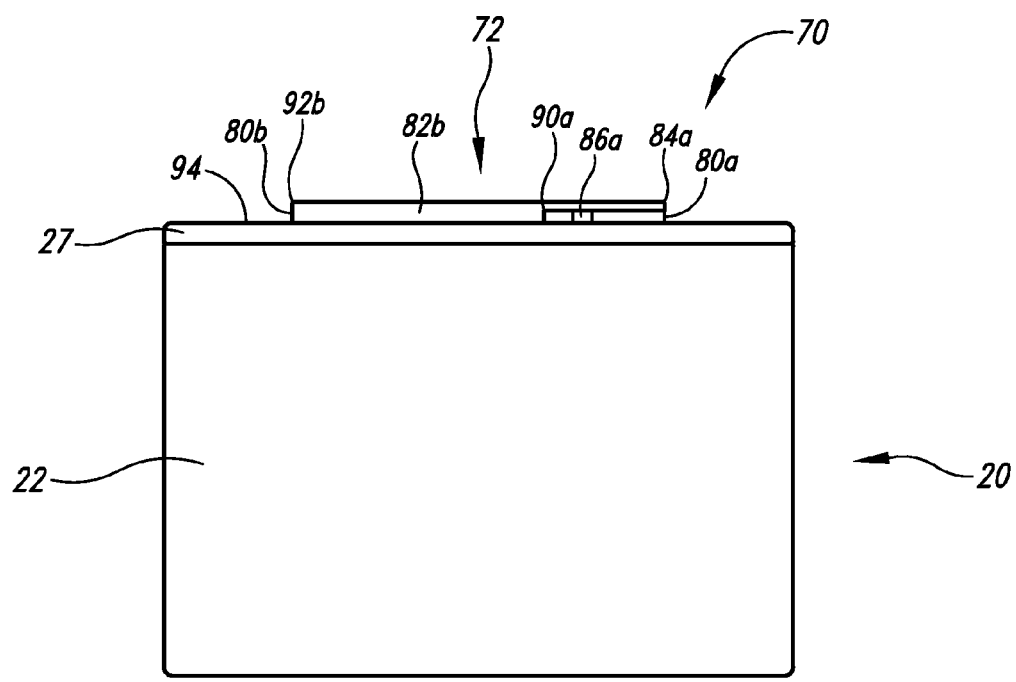
FIG. 6 is a front elevational view of the food container shown in FIG. 5.
Figure 7:
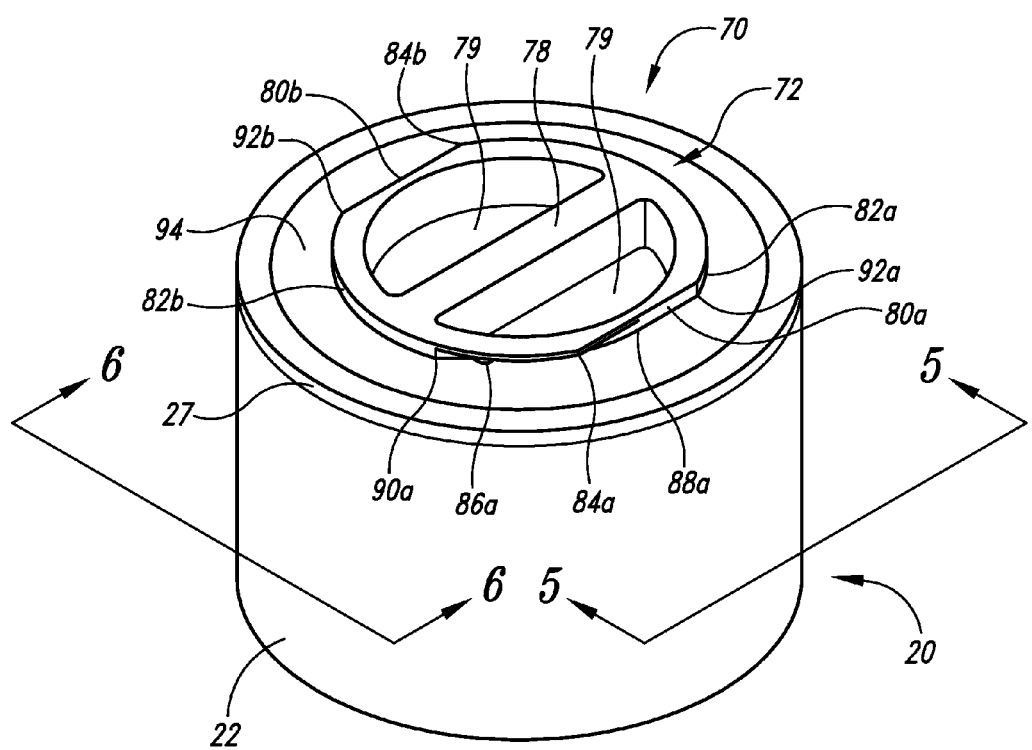
FIG. 7 is a top perspective view of the food container shown in FIGS. 5 and 6.

FIGS. 5-7 illustrate various views of the container 20 when closed by the adaptor lid 70. More specifically, FIG. 5 is a side elevational view of the container 20 and the adaptor lid 70 as viewed from the line 5-5 shown in FIG. 7. FIG. 6 is a side elevational view of the container 20 ad the adaptor lid 70 as viewed from the line 6-6 shown in FIG. 7. As can be seen in FIGS. 5-7, the adaptor lid 70 is configured such that the top surface 94 of the adaptor lid 70 is substantially aligned with the top surface 27 of the container 20 when the adaptor lid 70 closes the container. This configuration allows the top surface 27 of the container 20 to be substantially adjacent to the bottom closed end 19 of the container 10 when the containers are coupled to each other. As can be appreciated, the adaptor lid 70 is advantageously operative to couple two containers together without increasing the space (e.g., height) occupied by the containers.

Referring back to FIGS. 3-4, the operation of the container assembly 1 is now described. Initially, a user may fill the interior cavities 14 and 24 of the containers 10 and 20, respectively, with one or more consumable products, optionally using one or more divider receptacles 60 to separate consumable products within the same container. Then, a user may threadably engage the top lid 30 with the container 10 and the adaptor lid 70 with the container 20. Next, to couple the containers 10 and 20 together, the user may insert the adaptor lid coupling portion 72 of the container 20 into the recess of the container coupling portion 11 of the container 10 (in the bottom closed end 19 of the container 10). To achieve this, a user must align the straight portions 80a and 80b of the adaptor lid coupling portion 72 with the straight edges of the lock members 13a and 13b of the container coupling portion 11 of the container 10, which will also align the arcuate portions 82a and 82b of the adaptor lid coupling portion 72 with the arcuate lower edges 15a and 15b of the container coupling portion 11. Once the adaptor lid coupling portion 72 has been inserted into the container coupling portion 11, the user may then rotate the containers 10 and 20 relative to each other by about ⅛ turn (45 degrees), thereby engaging the downwardly projecting portion 86a and the opposite downwardly projecting portion (not shown, but positioned opposite the downwardly projecting portion 86a) with the notched portions 9a and 9b of the container coupling portion 11 to lock the containers together. Once the two containers are "locked" together, the user may transport the container assembly 1 using the handle 32. Further, the user may attach additional containers below the container assembly 1 by repeating the steps above. When the user wants to release the two containers 10 and 20 from each other and consume the contents therein, the user may simply reverse the steps above to unlock the containers from each other and remove their respective lids.

The foregoing embodiments described herein depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A container assembly for consumable products, comprising:
   a first receptacle defining a volume and having a top open end and a bottom closed end having a bottom surface, said first receptacle having threads disposed on an inner surface near said top open end with said threads adapted to permit threaded engagement of a lid to said top open end, said first receptacle further including a receptacle coupling portion including a recess extending upward from said bottom surface of said bottom closed end adapted to permit selective engagement of said first receptacle with another receptacle;
   a second receptacle defining a volume and having a top open end having a top surface and a bottom closed end, said second receptacle having threads disposed on an inner surface near said top open end with said threads adapted to permit threaded engagement of a lid to said top open end; and
   a first adaptor lid including an upper portion and a lower portion, said lower portion including a top surface having exterior threads therebelow adapted to permit threaded engagement between said first adaptor lid and said threads of said second receptacle such that said top surface of said lower portion of said first adaptor lid is coplanar with said top surface of said second receptacle when said first adaptor lid and said second receptacle are coupled together, said upper portion including an adaptor lid coupling portion adapted to extend upwardly into said recess of said receptacle coupling portion of said first receptacle to permit selective engagement of said first adaptor lid with said receptacle coupling portion of said first receptacle such that said bottom surface of said first receptacle is adjacent said top surface of said second receptacle when said first adaptor lid and said first receptacle are coupled together.

2. The container assembly of claim 1, further comprising:
a top lid including an upper portion and a lower portion, said lower portion including threads adapted to permit threaded engagement between said top lid and said threads of said first receptacle, said upper portion including a handle.

3. The container assembly of claim 1, wherein said second receptacle further includes a receptacle coupling portion including a recess disposed on an outer surface of said bottom closed end adapted to permit selective engagement of said second receptacle with another receptacle, the container assembly further comprising:
a third receptacle defining a volume and having a top open end and a bottom closed end, said third receptacle having threads disposed on an inner surface near said top open end, said threads adapted to permit threaded engagement of a lid to said top open end; and
a second adaptor lid including an upper portion and a lower portion, said lower portion including threads adapted to permit threaded engagement between said second adaptor lid and said threads of said third receptacle, said upper portion including an adaptor lid coupling portion adapted to permit selective engagement of said second adaptor lid with said receptacle coupling portion of said second receptacle.

4. The container assembly of claim 1, further comprising:
a divider receptacle defining a volume and shaped to be positioned within said first receptacle such that a first consumable product may be positioned in said first receptacle inside said divider receptacle, and a second consumable product may be positioned in said first receptacle outside said divider receptacle.

5. The container assembly of claim 1, wherein said first receptacle is substantially cylindrically shaped.

6. The container assembly of claim 1, wherein said recess of said receptacle coupling portion is defined by a circular interior sidewall, said receptacle coupling portion comprising two oppositely positioned lock members positioned at a lower end of said circular interior sidewall that extend inwardly beyond said circular interior sidewall and include a notched portion, said lock members bridging a portion of opposing sections of said recess to define a gap between said lock members and an opposing interior wall of said recess to allow selective engagement of said first receptacle with said adaptor lid, said lock members and said opposing sections of said recess defining a bottom opening, said adaptor lid coupling portion comprising a raised portion comprising two oppositely positioned substantially straight sidewall portions and two substantially arcuate sidewall portions extending therebetween, said straight sidewall portions and said arcuate sidewall portions together being sized to permit said raised portion to pass through said bottom opening, said adaptor lid coupling portion further comprising a first flange formed by portions of one of said straight sidewall portions and one of said arcuate sidewall portions that is raised above said top surface of said adaptor lid such that a gap is formed between said first flange and said top surface, said first flange including a downwardly projecting portion positioned on a bottom surface thereof that is operative to engage with said notched portion of one of said lock members, said adaptor lid coupling portion further comprising a second flange formed by portions of said other of said straight sidewall portions and said other of said arcuate sidewall portions that is raised above said top surface of said adaptor lid such that a gap is formed between said second flange and said top surface, said second flange including a downwardly projecting portion positioned on a bottom surface thereof that is operative to engage with said notched portion of said other of said lock members.

7. The container assembly of claim 1, wherein said first receptacle is integrally formed from an insulative material.

8. The container assembly of claim 1, wherein said first receptacle includes double wall foam insulation.

9. A container assembly for consumable products, comprising:
a first receptacle defining a volume and having a top open end having a top surface and a bottom closed end having a bottoms surface, said first receptacle having interior threads near said top open end with said interior threads adapted to permit threaded engagement of a lid to said top open end, said first receptacle further including a receptacle coupling portion including a recess extending upward from said bottom surface of said bottom closed end adapted to permit selective engagement of said first receptacle with another receptacle;
a second receptacle defining a volume and having a top open end having a top surface and a bottom closed end having a bottom surface, said second receptacle having interior threads near said top open end with said interior threads adapted to permit threaded engagement of a lid to said top open end;
a top lid including an upper portion and a lower portion, said lower portion including exterior threads adapted to permit threaded engagement between said top lid and said interior threads of said first receptacle, said upper portion including a handle; and
a first adaptor lid including an upper portion and a lower portion, said lower portion including a top surface having exterior threads therebelow adapted to permit threaded engagement between said first adaptor lid and said interior threads of said second receptacle such that said top surface of said lower portion of said first adaptor lid is coplanar with said top surface of said second receptacle when said first adaptor lid and said second receptacle are coupled together, said upper portion including an adaptor lid coupling portion adapted to extend upwardly into said recess of said receptacle coupling portion to permit selective engagement of said first adaptor lid with said receptacle coupling portion of said first receptacle such that said bottom surface of said first receptacle is adjacent said top surface of said second receptacle when said first adaptor lid and said first receptacle are coupled together.

10. The container assembly of claim 9, wherein said second receptacle further includes a receptacle coupling portion including a recess disposed on an outer surface of said bottom closed end adapted to permit selective engagement of said second receptacle with another receptacle, the container assembly further comprising:
a third receptacle defining a volume and having a top open end and a bottom closed end, said third receptacle having threads disposed on an inner surface near said top open end, said threads adapted to permit threaded engagement of a lid to said top open end; and
a second adaptor lid including an upper portion and a lower portion, said lower portion including threads adapted to permit threaded engagement between said second adaptor lid and said threads of said third receptacle, said upper portion including an adaptor lid coupling portion adapted to permit selective engagement of said second adaptor lid with said receptacle coupling portion of said second receptacle.

11. The container assembly of claim 9, wherein said first receptacle and said second receptacle are substantially identical.

12. The container assembly of claim 9, wherein said top lid further comprises:
an annular seal positioned adjacent to said threads and operative to provide a fluid-tight seal between said top lid and said first receptacle when said top lid and said first receptacle are threadably engaged with each other.

13. The container assembly of claim 9, wherein said first adaptor lid further comprises:
an annular seal positioned adjacent to said threads and operative to provide a fluid-tight seal between said first adaptor lid and said second receptacle when said first adaptor lid and said second receptacle are threadably engaged with each other.

14. The container assembly of claim 9, further comprising:
a divider receptacle defining a volume and shaped to be positioned within either one of said first receptacle and said second receptacle.

15. The container assembly of claim 9, wherein said first receptacle and said second receptacle are constructed from polypropylene.

16. The container assembly of claim 9, wherein said recess of said receptacle coupling portion of said first receptacle is defined by a circular interior sidewall, said receptacle coupling portion comprising two oppositely positioned lock members positioned at a lower end of said circular interior sidewall that extend inwardly beyond said circular interior sidewall and include a notched portion, said lock members bridging a portion of opposing sections of said recess to define a gap between said lock members and an opposing interior wall of said recess to allow selective engagement of said first receptacle with said adaptor lid, said lock members and said opposing sections of said recess defining a bottom opening, said adaptor lid coupling portion comprising a raised portion comprising two oppositely positioned substantially straight sidewall portions and two substantially arcuate sidewall portions extending therebetween, said straight sidewall portions and said arcuate sidewall portions together being sized to permit said raised portion to pass through said bottom opening, said adaptor lid coupling portion further comprising a first flange formed by portions of one of said straight sidewall portions and one of said arcuate sidewall portions that is raised above said top surface of said adaptor lid such that a gap is formed between said first flange and said top surface, said first flange including a downwardly projecting portion positioned on a bottom surface thereof that is operative to engage with said notched portion of one said lock members, said adaptor lid coupling portion further comprising a second flange formed by portions of said other of said straight sidewall portions and said other of said arcuate sidewall portions that is raised above said top surface of said adaptor lid such that a gap is formed between said second flange and said top surface, said second flange including a downwardly projecting portion positioned on a bottom surface thereof that is operative to engage with said notched portion of said other of said lock members.

17. The container assembly of claim 1, wherein said recess of said first receptacle coupling portion is defined by an interior sidewall and an upper wall coupled to the interior sidewall, said receptacle coupling portion comprising a lock member positioned at a lower end of said interior sidewall that extends inwardly beyond said interior sidewall, said lock member defining a gap between said lock member and said upper wall of said recess, said adaptor lid coupling portion comprising a raised portion sized to permit said raised portion to pass into said recess, said adaptor lid coupling portion comprising a flange configured to be positioned within said gap to selectively engage with said lock member to allow selective engagement of said first receptacle with said adaptor lid.

18. The container assembly of claim 9, wherein said recess of said first receptacle coupling portion is defined by an interior sidewall and an upper wall coupled to the interior sidewall, said receptacle coupling portion comprising a lock member positioned at a lower end of said interior sidewall that extends inwardly beyond said interior sidewall, said lock member defining a gap between said lock member and said upper wall of said recess, said adaptor lid coupling portion comprising a raised portion sized to permit said raised portion to pass into said recess, said adaptor lid coupling portion comprising a flange configured to be positioned within said gap to selectively engage with said lock member to allow selective engagement of said first receptacle with said adaptor lid.

* * * * *